United States Patent [19]

Usui et al.

[11] 4,071,388
[45] Jan. 31, 1978

[54] IMPULSE HEAT JOINING OF WRAPPING TAPES FOR WIRE CABLES

[75] Inventors: Kuniharu Usui, Fujisawa; Hiroshi Shimba, Yokohama; Kunihiro Nakagaki, Yokohama; Hiroaki Mukunashi, Yokohama, all of Japan

[73] Assignees: Sumitomo Electric Industries, Ltd., Osaka; Kuniharu Usui, Fujisawa, both of Japan

[21] Appl. No.: 688,194

[22] Filed: May 20, 1976

Related U.S. Application Data

[63] Continuation of Ser. No. 527,390, Nov. 26, 1974, abandoned.

[30] Foreign Application Priority Data

Nov. 26, 1973 Japan ............................ 48-132923

[51] Int. Cl.² ............................................ B29C 19/00
[52] U.S. Cl. ............................... 156/157; 93/DIG. 1; 156/53; 156/192; 156/306; 156/282; 156/311; 156/182; 156/304; 174/102 R; 174/107; 219/243; 428/457
[58] Field of Search ........................ 156/52–56, 156/157, 282, 182, 304, 184, 306, 192, 309, 203, 366, 218, 380, 272, 583, 311, 505; 428/212, 457; 219/243; 174/102 R, 107; 93/DIG. 1

[56] References Cited

U.S. PATENT DOCUMENTS

| 2,367,725 | 1/1945 | Lindh et al. | 156/304 |
| 2,494,905 | 1/1950 | Shumann | 156/282 |
| 2,630,396 | 3/1953 | Langer | 156/272 |
| 2,711,781 | 6/1955 | Langer | 156/306 |
| 2,726,222 | 12/1955 | Palmquist et al. | 156/157 |
| 2,765,837 | 10/1956 | Kenyon | 156/304 |
| 3,087,007 | 4/1963 | Jachimowicz | 156/54 |
| 3,272,912 | 9/1966 | Jachimowicz | 174/102 R |
| 3,321,572 | 5/1967 | Garner | 156/54 |
| 3,325,589 | 6/1967 | Mildner | 156/54 |
| 3,480,505 | 11/1969 | Donnell et al. | 156/583 |
| 3,504,102 | 3/1970 | Polizzano | 174/107 |

FOREIGN PATENT DOCUMENTS 4,540,440  12/1970  Japan ............................ 156/306

*Primary Examiner*—Charles E. Van Horn
*Assistant Examiner*—J. J. Gallagher
*Attorney, Agent, or Firm*—Sughrue, Rothwell, Mion, Zinn and Macpeak

[57] ABSTRACT

A jointer for laminated tapes for use in the production of sheathed cables formed by longitudinally or helically wrapping cable cores with metal tapes laminated with plastic films and by joining the overlapped portions of said tapes by way of heat fusion is disclosed. The method comprises the use of pressing blocks consisting of metal material having a high heat conductivity and respectively having machined surfaces opposing in parallel to each other for the application of uniform pressure to both surfaces of the laminated tapes held therebetween. A heating piece is provided which is electrically insulated from and mounted to the bottom of the pressing block and having relatively high electric resistance and being supplied with electric current thereby pulse heating the portions of the laminated tapes to be spliced.

2 Claims, 11 Drawing Figures

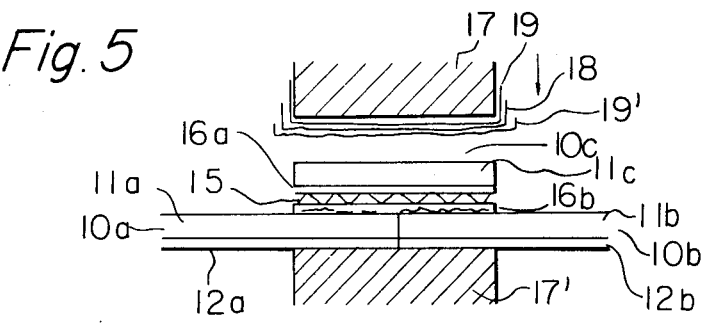
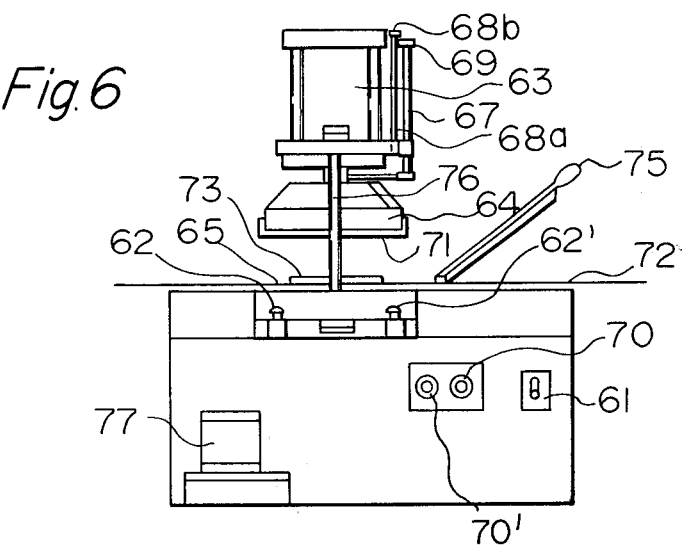
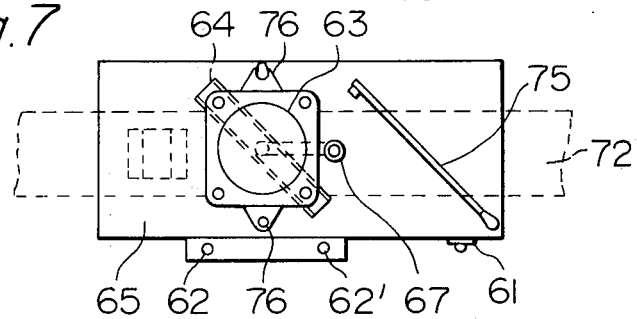

IMPULSE HEAT JOINING OF WRAPPING TAPES FOR WIRE CABLES

This is a continuation of application Ser. No. 527,390, filed Nov. 26, 1974, now abandoned.

BACKGROUND OF THE INVENTION

1. Field of the Invention

This invention relates to an impulse heat jointer for wrapping tapes of wire cables.

2. Description of the Prior Art

For the outer sheath of the communication cables, aluminum or steel tapes of flat and corrugated type have been generally used but recently, there is an increasing demand for the cables sheathed with laminated tapes, that is, metal coated on either or both sides thereof with plastic films. These laminated tapes are wrapped around the cable cores longitudinally or helically during the plastic sheath process for the cables. Since the plastic sheath process should naturally be carried out continuously for a considerable length of time, in view of cable manufacturing costs, working efficiency and uniform quality in the resulting product, the tapes for longitudinal wrapping should accordingly be supplied continuously and hence, the tape ends should be rapidly joined. Moreover, requirements for the mechanical strength in the joined portions of the tapes in particular the tensile strength and peel off strength of the joined portions and the peel off strength between the joined portions and the outer sheath have become stringent. In addition, achieving good electrical conductivity in those portions also becomes necessary.

In order to satisfy these diverse requirements, various joining methods have been developed and reported in the literature. These include, for example, a mechanical method in which the joint is effectuated by embossing the surfaces of two tapes to be joined or, alternatively, a method of applying continuous seam welds to the tapes, traversely.

A prior art system for applying the outer sheath to the cables is shown in FIG. 1 and FIG. 2, wherein reference numeral 1 denotes a tape supply source constructed in a dual system for the convenience of continuous tape supply. There is also shown a tape jointer 2, a tape accumulator 3 for storing sufficient amount of tape for supplying over the time required for the joint, an apparatus 4 for longitudinally applying the tape on the cable core, an extruder 5 for applying plastic coating on the cable and a cooling water trough 6 for use with cooling after the plastic coating.

The cross section of a joined portion of the tape according to the conventional mechanical joining method described above in shown in FIG. 3, wherein there are shown laminated tapes 10a and 10b, metal surfaces 11a and 11b thereof, the surfaces of the plastic films 12a and 12b laminated to said metal tapes, an active press block 13 embossed at the bottom thereof, a passive press block 14 also embossed at the surface thereof.

In this joining method, tapes to be joined are put between the active press block 13 and the passive press block 14 by lowering the former to the latter while applying an appropriate pressure thereon, and are then embossed at the adjacent surfaces and then joined mechanically.

This method is, however, unsatisfactory in that the peel off strength in the joined portions of the tape is poor and the electrical conduction between the tapes in insufficient due to the plastic layer left between two tapes that are joined.

FIG. 4 shows the joined portion of tapes made through the seam welding according to another prior art joining method, wherein there is shown laminated tapes 10a and 10b, surfaces of the metal sides 11a and 11b of the laminated tapes and surfaces of the plastic films 12a and 12b laminated to the metal sides. The seam portion is located at position B.

The method just described above is unsatisfactory in that the laminated plastic material must be removed from the upper tape at the joint portion prior to the joining and as can be seen from the drawing, the edges (Positions A in FIG. 4) of the joined tapes tend to turn up. Also, the tapes in the vicinity of the welded portions are reduced in strength while the seam welded portion per se possess considerable strength. This discontinuity in material quality along the tape is unacceptable.

SUMMARY OF THE INVENTION

This invention prvides an apparatus for use with a novel joining method capable of eliminating the disadvantages in the foregoing prior art methods.

An object of this invention is, therefore, to provide a heat jointer method for the jointing of laminated tapes with joining piece when used subsequently in the sheathing of wire cables, insuring sufficient tensile strength and peel off strength in the joining portions of the tapes as well as the peel off strength between the joined portions and the outer sheath without impairing the electrical conductivity by the employment of effective heater means.

Another object of this invention is to provide a heat jointer apparatus for the joint of the tape which comprises a fail-safe circuit for the prevention of the short-circuit burning and heat sink side plates for securing the longer life of the heater means.

A further object of this invention is to provide a heat jointer apparatus for the joint of the laminated tapes comprising cutter means disposed in predetermined angles and tape transfer means that enable the joining operation to be carried out at high efficiency, with an exact meeting of the joined portions and uniform quality in the products.

DESCRIPTION OF THE ACCOMPANYING DRAWINGS

FIG. 5 is a cross section of the joined portion of tapes which are joined by using the heat jointer apparatus according to this invention;

FIG. 6 is an elevational view of a heat jointer apparatus for the joint of laminated tapes according to this invention;

FIG. 7 is a plan view of the heat jointer apparatus shown in FIG. 6;

PREFERRED EMBODIMENTS OF THE INVENTION

Figure 1:
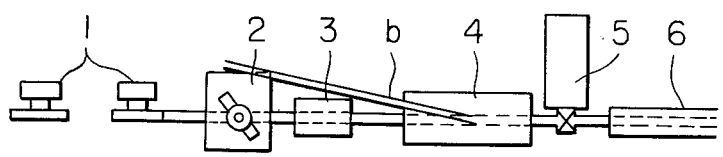
FIG. 1 is a schematic plan view of a prior art system for conducting the sheathing process of the wire cables.
Figure 2:
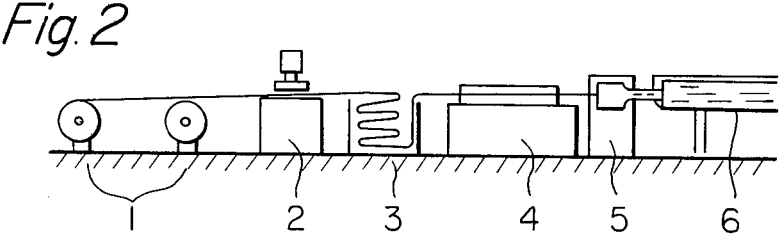
FIG. 2 is a schematic elevational view of the system shown in FIG. 1.
Figure 3:
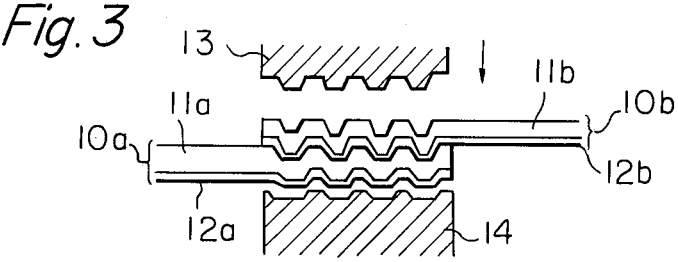
FIG. 3 is a cross section of the joined portion of tapes which are joined according to a prior art mechanical method.
Figure 4:
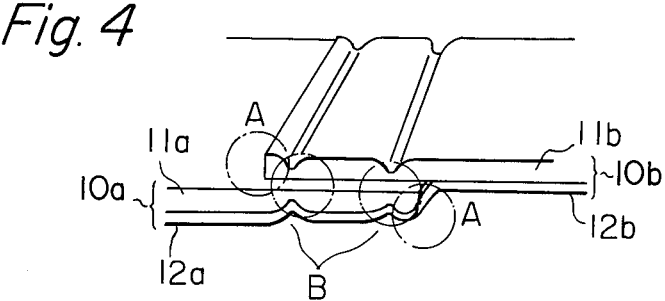
FIG. 4 is a schematic perspective view of the joined portion of tapes which are joined according to the prior art seam welding method.

This invention is to be described in detail by way of a preferred embodiment thereof referring to the accompanying drawings, particularly, to FIG. 5 which shows a cross section of the joined portion of the tapes which are joined according to the novel method by employing the apparatus of this invention. The laminated tapes 10a and 10b, have metal sides 11a and 11b with surfaces of the plastic films 12a and 12b laminated to said metal sides, joining piece 11c laminated at the under side thereof with adhesive materials 16a and 16b, electric conduction aids 15 such as a metal powder, metal gauze, or metal strip, for improving the electric conduction between each of said components 11a-11c-11b, adhesion materials 16a and 16b typically as a plastic film, and an active press block 17 with a flat bottom and having, at its bottom, an electrically insulated heating piece 18 of considerably high ohmic resistance as shown in FIG. 5.

One of the important features of the method involved in this invention resides in that a satisfactory electrical conduction can be achieved by exerting a certain pressure on the joined portion through the active press block 17 to cause the electric conduction aids 15 to break the adhesive material 16a under the metal piece 11c and the adhesion materials 16a and 16b. This method is also advantageous in that the adhesion materials 16a and 16b can be fused by heating onto the metal sides 11a and 11b of the laminated tapes 10a and 10b as well as on the surface of the adhesive material 16a laminated to the metal piece 11c. This also enables one to provide a sufficient mechanical strength by appropriate selection of the adhesion materials 16a and 16b. It also should be noted that the joined portions of the tapes may peel off due to the heating when the plastic sheath treatment is applied to the cables after wrapping the cable cores longitudinally or helically with the laminated tape. In order to avoid this peeling off, the adhesion plastic material 16 should be chosen so that its melting point is somewhat higher than that of the plastic films 12a and 12b that are laminated on the tapes 10a and 10b. Thus, the method used herein is much superior to the foregoing two prior art processes with regard to the mechanical strength and the electrical conduction of the joined portion of the tapes. An impulse heat jointer for wrapping tapes of wire cables according to this invention is used for the stable and effective practice of this novel method.

This invention basically provides an apparatus and method for the jointing of the laminated tapes in which the laminated tapes 10a and 10b are joined by applying pressure on both sides thereof through press plates 17 and 17' respectively, having machined surfaces opposing and in parallel with each other while heating for a prescribed of period. For accomplishing the heating, a heating piece 18 such as nickel-chromium alloy and the like having a considerably high ohmic resistance is used as a heating material and this heating material is electrically insulated from the press plate 17 by way of a heat insulation material 19, 19' such as polytetrafluoroethylene sold commercially as Teflon and set along the pressing surface of the press plate 17. The apparatus is adapted so that the laminated tapes to be joined are subjected to pressure under heating by the application of pressure through the press plates and with the electric current supply through the heating material for a prescribed of time previously set by timer means, and, after the completion of the press and heating, heat dissipation and cooling are rapidly effected through the heating material and the pressing plates thereby achiving the adhesion in a brief period of time.

Since the melting point of the plastic films 12a and 12b of the laminated tapes is as described herein lower than that of the adhesion materials 16a and 16b, the plastic films 12a and 12b and would be melted away when the adhesion plastic is heated for the fushion joint at the time of joining. In order to overcome this problem, it is necessary to heat the heater material in an extremely brief moment to a high temperature thereby producing an acute temperature inclination along the thickness of the joining piece 10c and the laminated tapes 10a, 10b so as to prevent the fusion and flowing of the laminated plastic films that are situated most remote from the heating piece. This can be attained in this invention by the application of necessary quantity of heat energy in a brief instance and rapid cooling thereafter by using a heater material having such high temperature coefficient of electric resistance that allows a high current to flow therethrough instantaneously to result high temperature within an extremely shorter period of time just at the time of supplying power source. For attaining this purpose it is required to properly determine the quantity of heat energy applied and the application time therefor as well as the heat dissipation rate to the most suitable values depending upon the material and the thickness of the laminated tapes to be joined. The apparatus of this invention is so designed that the electrical voltage applied to the heater for attaining the foregoing purpose can be controlled in several steps and the heating time is also adjustable by way of timer means. Since rapid heat dissipation and cooling are also important for the purpose, the active pressing plate and the passive pressing block are made of voluminous metal material having a high heat conductivity. Moreover, the press block can be incorporated, if the conditions permit, with a water cooling jacket for the more efficient cooling. The thermal conditions in the heat jointer apparatus of this invention can thus be determined satisfactorily by the foregoing considerations. While on the other hand, the condition for the pressing force is also one of the important factors in this invention. The pressing force is obtainable by using a pneumatic or hydraulic cylinder and the pressing force required for the joint of the laminated tapes can be optionally determined by the proper selection of pneumatic or hydraulic pressure. The time for the joint under pressure can also be determined by using timer means.

The operation of the apparatus of this invention is described by way of reference to a preferred embodiment thereof illustrated in FIGS. 6 and 7.

In FIG. 6, laminated tapes 72 and a joining piece 73 for use with the joint are already disposed at predetermined positions and the electrical power is supplied to the entire apparatus by turning a power switch 61 to ON. Then, by the simultaneous actuation of two switches 62 and 62', a pressure generator 63 mounted on supports 76 is operated to lower a pressing plate 64, and a slide bar 67 mechanically interlocked with said pressing plate 64 also begins to lower. When the pressing plate 64 is lowered to table 65 of the base block of the apparatus, a contact ring 69 mounted to the upper part of the slide bar 67 for movement therewith contacts a position detector 68a to actuate said detector, which, in turn, causes electric current to flow through a heater 71 that is attached to the bottom of the pressing plate 64 and start a timer 70 for the heater circuit, simultaneously. The times required for heating, under pressure, and cooling can be previously determined to prescribed of periods by the setting of the timers 70, 70'. Two timers are provided, one for the adjustment of the heating time and the other for the cooling time. The current applied to the heater 71 can be optionally determined by way of a transformer 77. After the elapse of a predetermined time, the power supply for the heater 71 is stopped by the timer 70 which controls the duration of the heating period. Then, another timer 70' for the control of cooling period is actuated and after the elapse of a predetermined of period the pressing plate 64 is raised along with the slide bar 67 interlocked with the pressing plate 64. When the contact ring 69 mounted to the slide bar 67 contact and actuates a position detector 68b, the pressing plate 64 is stopped at its original position.

In joining the laminated tapes under pressure while applying heating, plastic film surfaces of the tapes and adhesion material, etc., are melted to flow and act as lubricant to thereby dislocate the tapes right and left. In order to avoid such deviation, a tape retainer (not shown) interlocked with the foregoing pressing plate can be provided in this apparatus. Further, as an additional device, cutter means such as a blade 75 can also be provided so as to cut the laminated tape 72 previously in pedetermined of angles.

The heater itself must be electrically insulated with materials (usually, polytetrafluoroethylene sold as commercially Teflon) that are thin and insulation power for the rapid finish of heatjoint treatment by way of the rapid heat conduction in the heating cycle and rapid cooling thereafter. Unfortunately, fine defects such as pin holes end to occur in the thin insulation material due to the pressing force, over heat and other reaon. This tends to result in the short circuit between the heater and the materials to be joined and generate overcurrent in the circuit thereby causing severe burnings in the transformer, heater and other electrical parts. Particularly, when the metallic materials are to be joined, the shortcircuit failures not only cause burning of the parts but also present dangers to those operators of the machines.

Figure 8:
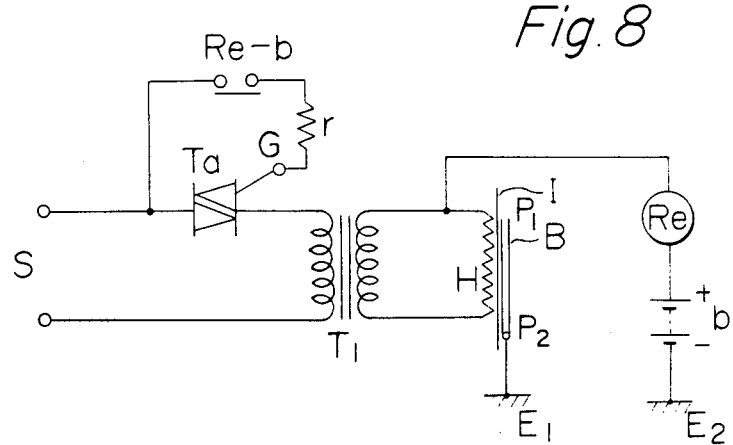
FIGS. 8 and 9 are circuit diagrams of the circuit for preventing short-circuit burning incorporated in the apparatus of this invention.

For the avoidance of short circuit burnings, a protection circuit shown in FIG. 8 is used in this invention in which an auxiliary circuit having a power source electrically independent of the heater circuit is provided. Further, as the metal tapes to be joined and the jointing machine itself are grounded to the earth in this invention if a short circuit occurs between the heater and said grounded portions, the auxiliary power supply circuit is electrically established through said shortcircuit portion to thereby actuate a high speed semiconductor switch or relay included in said circuit thus interrupting overcurrent from said heater circuit rapidly.

The operation of this protection circuit is described below referring to the drawings. When AC voltage is applied to a power source S in FIG. 8, a voltage is applied through a resistor $r$ to the gate G of a bidirectionally controlled rectifier device $T_a$ (contactless AC switch) by way of a high speed break contact of the high speed relay Re-$b$ to render said switching device conductive and supply current to transformer $T_1$. The heater H is thus operative. Then, if the insulation film I of the heater is broken to cause short-circuit failure between the heater H and the metallic body B to be connected at any points through $P_1$ - $P_2$, a circuit from the positive side of cell $b$ by way of a high speed relay Re, $E_1$ and $E_2$ to the negative side of $b$ is instantaneously established, and the relay Re is operated in this circuit. This interrupts the high speed break contact Re-$b$ thereby turning the bidirectionally controlled rectifier device $T_a$ to OFF thus cutting the current to the heater transformer $T_1$.

Figure 9:
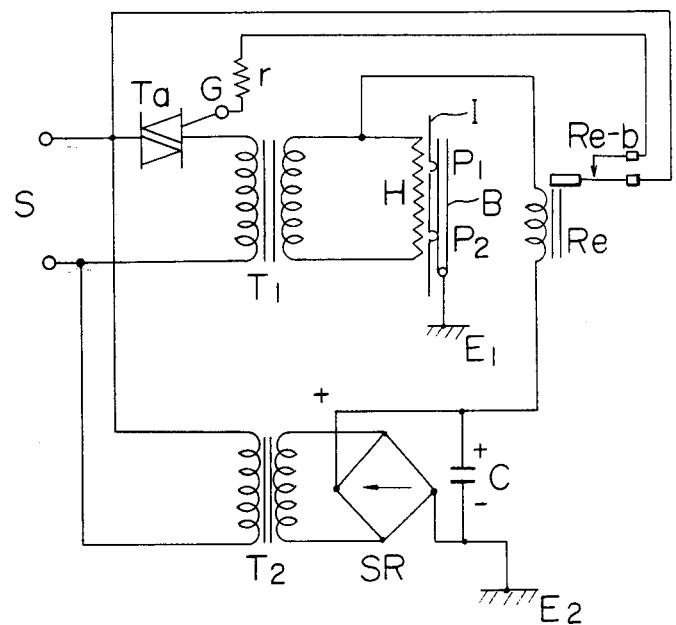

As a modification to the DC power source 6 in FIG. 8, as shown in FIG. 9, cell $b$ can be replaced with the combination of a transformer $T_2$, a rectifier SR and a capacitor C. Since the power supply for the heater can directly be interrupted when short-circuits occur at any point through $P_1$ and $P_2$, the protection circuit can completely prevent overcurrent from the heater and satisfactorily prevent the burnings.

The laminated tapes used in the apparatus of this invention can be varied depending upon the sizes of the cables. For instance, the tape width for use with the laminate sheathed cables can be selected within a wide range over 15mm - 400mm depending upon the sizes of the cables. It will be economic and effective if a heater of a certain width can be used to join tapes of various widths. But if the width of the heater is not equal to that of the tape, in particular, to those tapes having more than 0.1mm of thickness, gaps are formed between the portions of the heater in excess of the tape width and the table 65 of the base block shown in FIG. 6. Therefore, the heat in this portion must be released into air, which causes extreme increase in the temperature of the heating piece to bring about an over-heat condition. This shortens the service life of the heater and, in extreme cases, disconnects the heater due to the fusion.

In the apparatus of this invention, heat sink side plates are provided which are capable of adjusting their width for placing the laminated tapes portions between the pressing plates depending upon the width of the laminated tapes on the table 65 of the base block of the main body B shown in FIG. 6.

Figure 10:
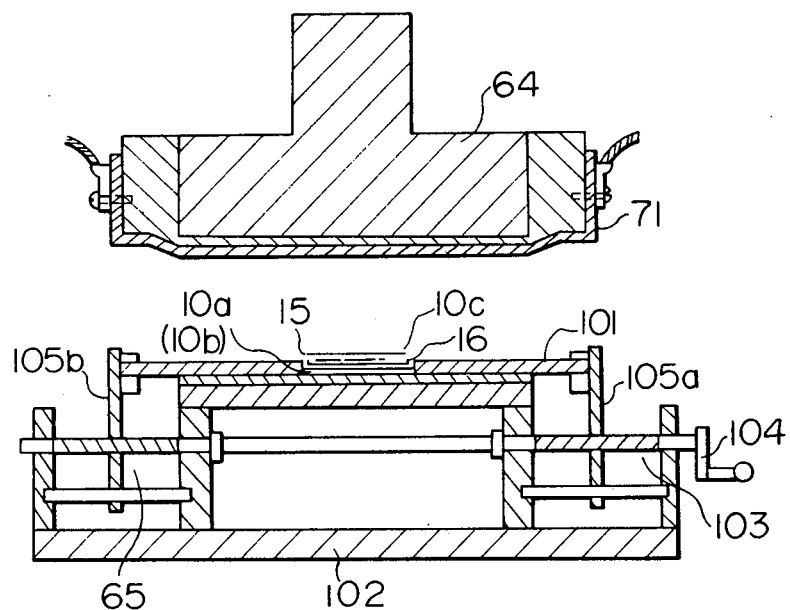
FIG. 10 is a schematic vertical cross section showing heat sink side plates for use with the heat jointer apparatus of this invention.

As shown in FIG. 10, reference numeral 101 denotes heat sink side plates for placing therebetween the joined portion of the laminated plastic tape 10a and 10b overlapped with the joining piece 10c, electric conduction aids 15 and the adhesion materials 16a and 16b, and having the thickness equal to that of the laminated tape 10a (10b) added with that of the jointing piece 10c. An adjusting lever 103 mounted to a base block 102 is provided with threaded portions at its both ends that are threaded in opposite directions with each other and adapted to be rotated by way of a handle 104. Levers 105a and 105b for supporting the heat sink side plates 101 are screwed with said threaded portions respectively and move in directions opposite to each other. The width for that portion of the laminated tape 10a (10b) placed between the pressing plates is adjusted by this movement and the air gaps between the heating piece and the table are accordingly eliminated. The heat sink side plates 101 are made of materials having approximately the same heat conductivity as that of the laminated tape 10a (10b) because the difference in the conductivity of the heat sink plates 101 and that of the laminated tape 10a (10b) in a difference in amount amounts of heat released from the laminated tapes 10a (10b) and those from the heat sink side plates 101 to cause distorsion in the heater 71 thereby decreasing the service life of the heater. The utilization of the heat sink side plates leads to uniform removal of heat energy released from the heater thus reducing the potential for damage due to over-heating.

In carrying out tape joining in this invention, it is required to position the tapes to be connected in exact relationship while abutting their end faces to each other prior to the joining operation. For this end, in the apparatus of this invention, a tape transfer device is provided capable of reducing the gaps in the abutting position of two tapes to less than 1 m/m and reducing the lateral deviation of the tapes to right and left to less than 1 m/m.

Figure 11:
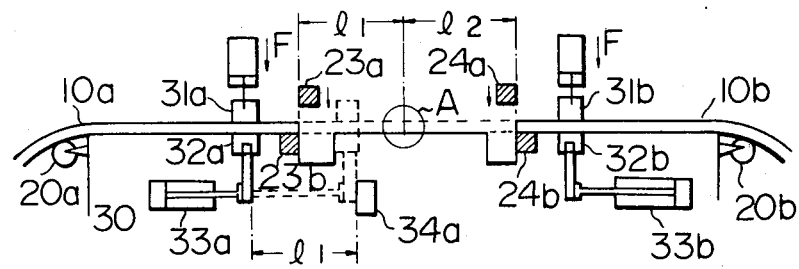
FIG. 11 is a schematic vertical section of tape transfer means for use with the heat jointer apparatus of this invention.

The vertical cross section of such a tape transfer device is shown in FIG. 11 wherein tapes 10a and 10b at the right and left sides in the FIGURE are held between receiving pads 32a and 32b by keep plates 31a and 31b with a certain pressing force F, and they are cut by two pairs of cutters 23a, 23b and 24a, 24b at positions apart from a predetermined position A by the distances of $l_1$ and $l_2$, respectively. After the cutting, pneumatic cylinders 33a and 33b are actuated to advance to positions abutting the stoppers 34a and 34b (not shown) respectively. Since the keeping plates 31a and 31b and the receiving pads 32a and 32b are mechanically interlocked with the air cylinders 33a and 33b, they move in a similar manner as the pneumatic cylinders 33a and 33b while holding the tapes therebetween. By situating the stoppers 34a and 34b previously at the positions apart from the starting points of the air cylinders 33a and 33b by the distances of $l_1$ and $l_2$, respectively, the distance between the tape starting points and the predetermined meeting point A can be preset as $l_1$ and $l_2$ and thus the two tapes 10a and 10b can be met at the predetermined position. The tape transfer device used in this invention enables one to eliminate the relative slipping between the tapes and keeping plates 31a and 31b or between the tapes and the pads 32a and 32b thereby completely preventing the lateral deviation of the tape to right and left in the tape feeding.

Since the transfer distances to the predetermined meeting point can be set mechanically by using mechanical stoppers 34a and 34b, the tapes can be transferred to the predetermined position easily and without errors by using sufficiently rigid material for the stoppers 34a and 34b.

As is apparent, the heat jointer apparatus of this invention is advantageous in that excellent tensile strength and peel off strength in the joined portions of the laminated tapes can be obtained as well as sufficient values for the peel off strength between the joined portion and the outer sheath of the cables to prevent the detaching of the plastic film from the tapes can be obtained without impairing the electric conductivity of the tapes by the employment of the heater described above. In addition, safety function and longer life of the heater can be attained by the employment of a protection circuit for short-circuit burnings and the heat sink side plates. Moreover, the provision of cutters set at predetermined angles and a tape transfer device enables the joining work to be carried out at good efficiency and with good accuracy for the size of the joining portions. This apparatus can, of course, be applied also to the joint of the laminated tapes that do not require the electrical conductivity.

While the invention has been described in detail and with reference to specific embodiments thereof, it will be apparent to one skilled in the art that various changes and modifications can be made therein without departing from the spirit and scope thereof.

What is claimed is:

1. A method of joining end abutting metal tapes in order to continuously supply the tapes for the production of sheathed cables formed by longitudinally wrapping cable cores with the tapes, the tapes being laminated on the side remote from the cable core with a plastic film having a relatively low melting temperature, said method comprising:

placing end abutting metal tape portions on a first, relatively fixed pressing block with the film layer of said metal tapes in contact with said block, overlying the abutting ends of said metal tape on the side opposite the plastic film with an adhesive plastic film strip having a melting temperature above that of the plastic film laminated to said metal tape, pressing said adhesive plastic film strip against said abutting ends of said metal tape by applying under pressure a second metal block of high thermal conductivity forming a heat dissipating sink and having an electric heating element of high electrical resistance mounted to the face of the second block which immediately faces said adhesive plastic film strip with said electric heating element being electrically insulated from said second block, and applying an electrical current pulse to said electric heating element having an amplitude and duration sufficient to establish an acute temperature gradient across the metal tape assembly sufficient to melt the adhesive plastic film strip insufficient to melt the low melting temperature plastic film on said metal tape;

whereby, said abutting ends of said metal tape portion are quickly joined and the resulting joint has high mechanical strength and electrical continuity.

2. A method of joining as defined in claim 1, further comprising incorporating within said adhesive plastic film strip:

a. a first layer of plastic adhesive material directly overlying and contacting said abutting metal tape portions, b. a layer of electrical conduction assisting material, overlying said first layer of plastic adhesive material, c. a second layer of plastic adhesive material overlying said electrical conduction assisting layer, and d. a thin metal layer of electrically conductive material overlying said second layer of plastic adhesive material, whereby, said electrical conduction assisting material and thin metal layer facilitate electrical conduction between said abutting metal tape portions.

* * * * *